US012637038B1

(12) United States Patent
Saylor et al.

(10) Patent No.: US 12,637,038 B1
(45) Date of Patent: May 26, 2026

(54) TRAILER LOADING SUSPENSION SWAY AND ROLLAWAY DETECTION AND PREVENTION

(71) Applicant: GM Global Technology Operations LLC, Detroit, MI (US)

(72) Inventors: Brian K. Saylor, South Lyon, MI (US); Devon Robert Hall, Ann Arbor, MI (US); Matthew Watts, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 18/960,583

(22) Filed: Nov. 26, 2024

(51) Int. Cl.
B60T 7/12 (2006.01)
B60D 1/30 (2006.01)
(52) U.S. Cl.
CPC .............. B60T 7/12 (2013.01); B60D 1/305 (2013.01); B60T 2240/06 (2013.01)
(58) Field of Classification Search
CPC ........ B60T 7/12; B60T 2240/06; B60D 1/305
USPC ........................................ 701/37–40, 48, 70
See application file for complete search history.

(56) References Cited

U.S. PATENT DOCUMENTS

| | | | |
|---|---|---|---|
| 12,233,853 B2 * | 2/2025 | Weston | ............. B60W 50/0097 |
| 2008/0172163 A1 * | 7/2008 | Englert | ................. B60T 8/1708 |
| | | | 303/147 |
| 2024/0132054 A1 | 4/2024 | Weston et al. | |

FOREIGN PATENT DOCUMENTS

| | | |
|---|---|---|
| DE | 102019113995 A1 | 4/2020 |
| EP | 3865324 A1 | 8/2021 |

* cited by examiner

*Primary Examiner* — Hai H Huynh
(74) *Attorney, Agent, or Firm* — Vivacqua Crane, PLLC

(57) ABSTRACT

A system for trailer loading suspension sway and rollaway (TLSR) detection in a vehicle includes a trailer attached to a vehicle via a hitch. Sensors detect a load on vehicle suspension. A TLSR application monitors vehicle state information, determines that initialization conditions have been met, and monitors, via the sensors, vertical loads on front and rear vehicle axles. The TLSR application determines rear axle vertical load and generates at least one of: an overload alert, a sway alert, and a rollaway alert. Upon generating at least one of the overload alert, sway alert, and rollaway alert, the TLSR application notifies a vehicle operator that a vertical load exerted by the trailer has exceeded a positive load threshold, a calibratable minimum negative load threshold, and/or a calibratable negative rear axle load threshold unless and until none of the thresholds have been exceeded.

20 Claims, 3 Drawing Sheets

TRAILER LOADING SUSPENSION SWAY AND ROLLAWAY DETECTION AND PREVENTION

INTRODUCTION

The present disclosure relates to trailers, and more specifically to the detection and mitigation of sway and rollaway of vehicles hitched to trailers. Towed trailers are susceptible to sway caused by a variety of different factors, including horizontal crosswinds, road inconsistencies, misloading off trailer or other effects. Sway can cause a vehicle/trailer system to become unstable, potentially creating jackknife scenarios.

Conventional trailer sway reduction systems utilize a tow-vehicle's electronic stability control system, but such systems do not monitor or generate tension at a trailer hitch. In addition, because conventional systems utilize yaw rate sensors and the like to detect vehicle yaw oscillations that occur in a specific frequency band that would coincide with trailer sway, such systems do not know that a trailer is connected in advance, and rely upon the detection of oscillations to verify that trailer sway is occurring.

Accordingly, while conventional trailer sway reduction systems operate for their intended purpose, there is a need for a new and improved system and method for trailer loading suspension sway and rollaway detection and prevention that maintain or decrease overall system complexity, improve system redundancy and robustness, decrease the potential for improperly loaded trailers to be used, reduce the potential for human operator error, and maintain or reduce system complexity while making use of preexisting hardware.

SUMMARY

According to several aspects of the present disclosure, a system for trailer loading suspension sway and rollaway detection in a vehicle includes a vehicle, and a trailer movably attached to the vehicle via a hitch. The system further includes one or more sensors. The one or more sensors directly or indirectly detect a load on suspension of the vehicle. The system further includes a controller having a processor, a memory, and input/output (I/O) ports. The I/O ports are in communication with the one or more sensors. The processor executes program code portions stored in the memory. The program code portions include a TLSR application having at least first, second, third, fourth, and fifth control logics. The first control logic monitors vehicle static and dynamic state information. The second control logic determines that predetermined initialization conditions have been met. Upon determining that the initialization conditions have been met, the third control logic monitors, via the one or more sensors, vertical loads on each of front and rear axles of the vehicle. The fourth control logic determines a rear axle vertical load and generates at least one of: an overload alert, a sway alert, and a rollaway alert. Upon generating at least one of the overload alert, sway alert, and rollaway alert, the fifth control logic notifies a vehicle operator that a vertical load exerted by the trailer on the hitch has exceeded one or more of a positive load threshold, a calibratable minimum negative load threshold, and a calibratable negative rear axle load threshold. Notifications to the vehicle operator continue unless and until none of the positive load threshold, calibratable minimum negative load threshold and calibratable negative rear axle load threshold have been exceeded.

In another aspect of the present disclosure the one or more sensors include: wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle. The sensors capable of directly and/or indirectly measuring a vertical or normal force loading and/or vertical displacement or ride height of a front axle and a rear axle of the vehicle include one or more of: suspension load detection sensors, suspension displacement sensors, Semi Active Damping Suspension (SADS), air suspension sensors, and continuous damping control (CDC) ride height sensors.

In another aspect of the present disclosure the first control logic further includes: control logic that monitors vehicle wheel speed, transmission state or position, brake application state, suspension system load, trailer connectivity, and trailer loading mode.

In another aspect of the present disclosure the second control logic further includes: control logic that determines that a trailer is connected to the vehicle at the hitch and control logic that determines that a transmission of the vehicle is in a park state. The second control logic further determines that brakes of the vehicle are not currently applied, and upon determining that one or more of: a trailer is not connected, the transmission is not in a park state, and the brakes are currently being applied, continues monitoring vehicle wheel speed, transmission state or position, brake application state, suspension system load, trailer connectivity. Upon determining that: a trailer is connected, the transmission is in a park state, and the brakes are not applied, the second control logic further generates an output indicating that the predetermined initialization conditions have been met.

In another aspect of the present disclosure fourth control logic further includes: control logic that, upon determining that a positive rear axle vertical load is being applied by the trailer via the hitch, compares the positive rear axle vertical load to a calibratable positive load threshold. Upon determining that the positive rear axle vertical load meets or exceeds the calibratable positive load threshold, the fourth control logic generates a notification to the vehicle operator including an overload alert.

In another aspect of the present disclosure the fourth control logic further includes: control logic that, upon determining that a zero or negative rear axle vertical load is being applied by the trailer via the hitch, compares the zero or negative rear axle vertical load to a calibratable minimum negative load threshold. Upon determining that the negative rear axle vertical load does not exceed the calibratable minimum negative load threshold, the fourth control logic generates a notification to the vehicle operator including a sway alert.

In another aspect of the present disclosure the calibratable minimum negative load threshold further comprises: a calibratable range of negative rear axle loads that extends from approximately a zero or neutral load to an approximately 25% negative load on the rear axle.

In another aspect of the present disclosure the fourth control logic further includes: control logic that, upon determining that a negative rear axle vertical load is being applied by the trailer via the hitch, compares the negative rear axle vertical load to the calibratable negative rear axle load threshold, and upon determining that the negative rear axle vertical load meets or exceeds the calibratable negative rear axle load threshold or upon detecting front axle roll, generates a notification to the vehicle operator including a rollaway alert. The calibratable negative rear axle load threshold further includes: a range of values extending from approximately a 50% to a 100% negative load on the rear axle. A 100% negative load on the rear axle indicates that the rear axle is entirely unloaded and that rear wheels attached to the rear axle no longer provide frictional contact with ground beneath the vehicle.

In another aspect of the present disclosure the fifth control logic further includes: control logic that generates audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle. The fifth control logic further generates notifications via wireless-communication-enabled devices including: mobile computing devices, laptop computers, tablet computers, and cellular phones. The notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded.

In another aspect of the present disclosure the fifth control logic further includes: control logic that automatically engages vehicle brakes during a rollaway alert, thereby preventing the vehicle and trailer from rolling despite the trailer exerting a negative rear axle load that meets or exceeds the calibratable negative rear axle load threshold.

In another aspect of the present disclosure a method for trailer loading suspension sway and rollaway (TLSR) detection in a vehicle includes: directly or indirectly detecting a load exerted by a trailer on suspension of the vehicle with one or more sensors. The trailer is movably attached to the vehicle via a hitch. The method further includes executing, by a processor of a controller of the vehicle, program code portions stored in memory of the controller, the controller further including input/output (I/O) ports in communication with the one or more sensors, the program code portions including a TLSR application. The TLSR application includes control logic for: monitoring vehicle static and dynamic state information, and determining that predetermined initialization conditions have been met. Upon determining that the initialization conditions have been met, the TLSR application monitors, via the one or more sensors, vertical loads on each of front and rear axles of the vehicle. The TLSR application determines a rear axle vertical load and generating at least one of: an overload alert, a sway alert, and a rollaway alert. Upon generating at least one of the overload alert, sway alert, and rollaway alert, the TLSR application notifies a vehicle operator that a vertical load exerted by the trailer on the hitch has exceeded one or more of a positive load threshold, a calibratable minimum negative load threshold, and a calibratable negative rear axle load threshold. Notifications to the vehicle operator continue unless and until none of the positive load threshold, calibratable minimum negative load threshold and calibratable negative rear axle load threshold have been exceeded.

In another aspect of the present disclosure the method further includes directly or indirectly detecting a load exerted by the trailer on suspension of the vehicle with one or more of: wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle. The sensors capable of directly and/or indirectly measuring a vertical or normal force loading and/or a vertical displacement or ride height of a front axle and a rear axle of the vehicle include one or more of: suspension load detection sensors, suspension displacement sensors, Semi Active Damping Suspension (SADS), air suspension sensors, and continuous damping control (CDC) ride height sensors.

In another aspect of the present disclosure the method further includes monitoring vehicle wheel speed, transmission state or position, brake application state, suspension system load, trailer connectivity, and trailer loading mode.

In another aspect of the present disclosure the method further includes: determining that a trailer is connected to the vehicle at the hitch, determining that a transmission of the vehicle is in a park state, and determining that brakes of the vehicle are not currently applied. Upon determining that one or more of: a trailer is not connected, the transmission is not in a park state, and the brakes are currently being applied, the method continues to monitor vehicle wheel speed, transmission state or position, brake application state, suspension system load, trailer connectivity. Upon determining that: a trailer is connected, the transmission is in a park state, and the brakes are not applied, the method generates an output indicating that the predetermined initialization conditions have been met.

In another aspect of the present disclosure the upon determining that a positive rear axle vertical load is being applied by the trailer via the hitch, the method compares the positive rear axle vertical load to a calibratable positive load threshold; and upon determining that the positive rear axle vertical load meets or exceeds the calibratable positive load threshold, the method generates a notification to the vehicle operator including an overload alert.

In another aspect of the present disclosure upon determining that a zero or negative rear axle vertical load is being applied by the trailer via the hitch, the method compares the zero or negative rear axle vertical load to a calibratable minimum negative load threshold. The calibratable minimum negative load threshold further includes a calibratable range of negative rear axle loads that extends from approximately a zero or neutral load to an approximately 25% negative load on the rear axle. Upon determining that the negative rear axle vertical load does not exceed the calibratable minimum negative load threshold, the method generates a notification to the vehicle operator including a sway alert.

In another aspect of the present disclosure upon determining that a negative rear axle vertical load is being applied by the trailer via the hitch, the method compares the negative rear axle vertical load to the calibratable negative rear axle load threshold. Upon determining that the negative rear axle vertical load meets or exceeds the calibratable negative rear axle load threshold or upon detecting front axle roll, the method generates a notification to the vehicle operator including a rollaway alert. The calibratable negative rear axle load threshold further includes: a range of values extending from approximately a 50% to a 100% negative load on the rear axle. A 100% negative load on the rear axle indicates that the rear axle is entirely unloaded and that rear wheels attached to the rear axle no longer provide frictional contact with ground beneath the vehicle.

In another aspect of the present disclosure the method further includes generating audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle. The method further includes generating notifications via wireless-communication-enabled devices including: mobile computing devices, laptop computers, tablet computers, and cellular phones. The notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded.

In another aspect of the present disclosure the method further includes automatically engaging vehicle brakes during a rollaway alert, thereby preventing the vehicle and trailer from rolling despite the trailer exerting a negative rear axle load that meets or exceeds the calibratable negative rear axle load threshold.

In another aspect of the present disclosure the method further includes a method for trailer loading suspension sway and rollaway (TLSR) detection in a vehicle includes: directly or indirectly detecting a load exerted by a trailer on suspension of the vehicle with one or more sensors including: wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle, including one or more of: suspension load detection sensors, suspension displacement sensors, Semi Active Damping Suspension (SADS), air suspension sensors, and continuous damping control (CDC) ride height sensors. The trailer is movably attached to the vehicle via a hitch. The method further includes executing, by a processor of a controller of the vehicle, program code portions stored in memory of the controller, the controller further including input/output (I/O) ports in communication with the one or more sensors, the program code portions including a TLSR application. The TLSR application includes control logic for: monitoring vehicle wheel speed, transmission state or position, brake application state, suspension system load, trailer connectivity, and trailer loading mode. The TLSR application further determines that predetermined initialization conditions have been met, including: determining that a trailer is connected to the vehicle at the hitch; determining that a transmission of the vehicle is in a park state; and determining that brakes of the vehicle are not currently applied. Upon determining that one or more of: a trailer is not connected, the transmission is not in a park state, and the brakes are currently being applied, the TLSR application and method continue to monitor vehicle wheel speed, transmission state or position, brake application state, suspension system load, trailer connectivity. Upon determining that: a trailer is connected, the transmission is in a park state, and the brakes are not applied, the TLSR application and method generate an output indicating that the predetermined initialization conditions have been met, and monitoring via the one or more sensors, vertical loads on each of front and rear axles of the vehicle. The TLSR application and method determine a rear axle vertical load and generating at least one of: an overload alert, a sway alert, and a rollaway alert. Upon determining that a positive rear axle vertical load is being applied by the trailer via the hitch, the TLSR application and method compare the positive rear axle vertical load to a calibratable positive load threshold. Upon determining that the positive rear axle vertical load meets or exceeds the calibratable positive load threshold, the TLSR application and method generate a notification to a vehicle operator including an overload alert. Upon determining that a zero or negative rear axle vertical load is being applied by the trailer via the hitch, the TLSR application and method compare the zero or negative rear axle vertical load to a calibratable minimum negative load threshold. The calibratable minimum negative load threshold further includes: a calibratable range of negative rear axle loads that extends from approximately a zero or neutral load to an approximately 25% negative load on the rear axle. Upon determining that the negative rear axle vertical load does not exceed the calibratable minimum negative load threshold, the TLSR application and method generate a notification to the vehicle operator including a sway alert. Upon determining that a negative rear axle vertical load is being applied by the trailer via the hitch, the TLSR application and method compare the negative rear axle vertical load to the calibratable negative rear axle load threshold. Upon determining that the negative rear axle vertical load meets or exceeds the calibratable negative rear axle load threshold or upon detecting front axle roll, TLSR application and method generate a notification to the vehicle operator including a rollaway alert. The calibratable negative rear axle load threshold further includes: a range of values extending from approximately a 50% to a 100% negative load on the rear axle, wherein a 100% negative load on the rear axle indicates that the rear axle is entirely unloaded and that rear wheels attached to the rear axle no longer provide frictional contact with ground beneath the vehicle. Upon generating at least one of the overload alert, sway alert, and rollaway alert, TLSR application and method provide the overload alert, sway alert, and rollaway alert to vehicle operators via audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle. The TLSR application and method generate notifications via wireless-communication-enabled devices including: mobile computing devices, laptop computers, tablet computers, and cellular phones. The notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded. The TLSR application and method automatically engage vehicle brakes during a rollaway alert, thereby preventing the vehicle and trailer from rolling despite the trailer exerting a negative rear axle load that meets or exceeds the calibratable negative rear axle load threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
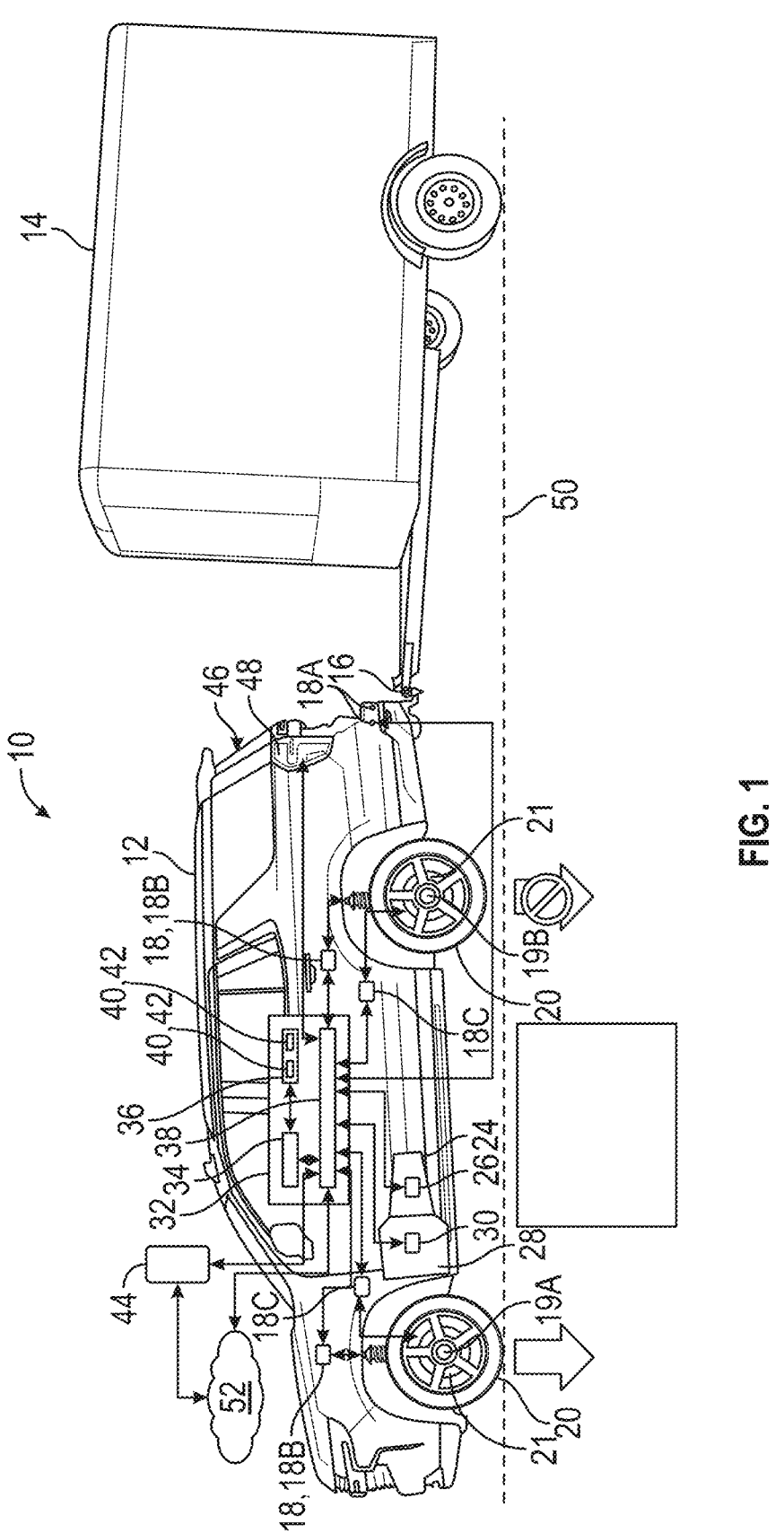
FIG. 1 is a schematic diagram of a system for trailer loading suspension sway and rollaway detection and prevention according to an exemplary embodiment.

Referring to FIG. 1, a system 10 for trailer loading suspension sway and rollaway detection and prevention is depicted schematically. The system 10 includes a vehicle 12 connected to a trailer 14 via a hitch 16. The vehicle 12 is illustrated as a passenger vehicle, however, it should be appreciated that the vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12 which both makes contact with the ground and which may be connected to a trailer 14. Similarly, the trailer 14 is depicted as a box trailer, however it should be appreciated that the trailer 14 may be any type of trailer 14, including but not limited to: enclosed trailers, dump trailers, flatbed trailers, utility trailers, Conestoga trailers, car trailers, multi-vehicle trailers, lowboy trailers, refrigerated trailers, boat trailers, landscape trailers, car hauling trailers, gooseneck trailers, and the like. The hitch 16 is depicted as a receiver hitch with a ball attachment, however it will be appreciated that the hitch 16 may be any of a wide variety of hitches 16 such as receiver hitches, $5^{th}$ wheel hitches, gooseneck hitches, weight distribution hitches, pintle hitches, or the like.

The system 10 further includes one or more sensors 18 integrated into the vehicle 12 and/or the trailer 14. The sensors 18 detect static and dynamic information about the vehicle 12 and trailer 14, and may include, but are not limited to: electromagnetic (EM) sensors 18A such as cameras, infra-red cameras, video cameras, light detection and ranging (LiDAR) sensors, radio detection and ranging (RADAR) sensors, sound navigation and ranging (SONAR) sensors, and the like. EM sensors 18A, such as those described above, may be used to determine a proximity of the vehicle 12 and/or trailer 14 to one another, and/or to objects in the environment surrounding the vehicle 12 and/or trailer 14. The sensors 18 may further include sensors 18 capable of directly and/or indirectly measuring vehicle 12 and trailer 14 static and dynamic states, including but not limited to: inertial measurement units (IMUs), suspension sensors 18B and control units such as Semi Active Damping Suspension (SADS), air suspension sensors, continuous damping control (CDC) ride height sensors, global positioning system (GPS), wheel 20 speed and/or brake 21 sensors 18C capable of measuring rotational speeds of one or more wheels 20 of the vehicle 12, throttle position sensors, accelerator pedal position sensors, steering position sensors capable of measuring a steering system position, steering rate, and steering velocity, tire pressure monitoring systems, aerodynamic element position sensors, and the like. In several examples, the suspension sensors 18B and control units such as Semi Active Damping Suspension (SADS), air suspension sensors, continuous damping control (CDC) ride height sensors, and the like define vehicle 12 axle load detecting equipment, capable of monitoring a vertical or normal force loading of the suspension of the vehicle 12. More specifically, the suspension sensors 18B and control units such as Semi Active Damping Suspension (SADS), air suspension sensors, CDC ride height sensors, and the like of exemplary non-limiting embodiments are capable of directly and/or indirectly measuring a vertical or normal force loading and/or a vertical displacement or ride height of a front axle 19A and a rear axle 19B of the vehicle 12.

The IMUs can measure movement, acceleration, and the like in several degrees of freedom. In a specific example, the IMUs may measure position, movement, acceleration, etc. in at least three degrees of freedom. Likewise, the SADS sensors may be IMUs capable of measuring in three or more degrees of freedom. In some examples, the SADS may be suspension hub accelerometers, or the like. Accordingly, vehicle 12 state information may include any of a wide variety of data including but not limited to: wheel 20 speed data, SADS, GPS, and IMU data including attitude, acceleration, location, and the like. The sensors 18 may further include vehicle 12 powertrain system 22 sensors, including but not limited to transmission 24 sensors 26, engine 28 control sensors 30, and the like without departing from the scope or intent of the present disclosure.

The system 10 further includes one or more controllers 32 in communication with the various sensors 18 of the vehicle 12 and/or trailer 14, processes information received therefrom, and generates output signals that are used to control or alter performance of the vehicle 12 and/or trailer 14. The controllers 32 are integrated into the vehicle 12. More specifically, the controllers 32 are non-generalized, electronic control devices having a preprogrammed digital computer or processor 34, non-transitory computer readable medium or memory 36 used to store data such as control logic, software applications, instructions, computer code, data lookup tables, etc., and input/output (I/O) ports 38. Computer readable medium or memory 36 includes any type of medium capable of being accessed by a computer, such as read only memory (ROM), random access memory (RAM), a hard disk drive, a compact disk (CD), a digital video disc (DVD), or any other type of memory. A "non-transitory" computer readable memory 36 excludes wired, wireless, optical, or other communication links that transport transitory electrical or other signals. A non-transitory computer readable memory 36 includes media where data can be permanently stored, and media where data can be stored and later overwritten, such as a rewritable optical disc or an erasable memory device. Computer code includes any type of program code, including source code, object code, and executable code. The processor 34 is configured to execute the code or instructions. The vehicle 12 may have additional controllers 32 such as a dedicated Wi-Fi controller, an engine control module, a transmission control module, a body control module, an infotainment control module, or the like. The I/O ports 38 may be configured to communicate via wired communications, wirelessly via Wi-Fi protocols under IEEE 802.11x, or the like without departing from the scope or intent of the present disclosure.

The controller 32 further includes one or more applications 40. An application 40 is a software program configured to perform a specific function or set of functions. The application 40 may include one or more computer programs, software components, sets of instructions, procedures, functions, objects, classes, instances, related data, or portions thereof adapted for implementation in a suitable computer readable program code. The applications 40 may be stored within the memory 36 or in additional or separate memory 36. Examples of applications 40 include audio or video streaming services, games, browsers, social media, etc. In other examples, the applications 40 are used to manage body control system functions, suspension control system functions, transmission and/or engine control system functions or the like in an exemplary vehicle 12.

Figure 2:
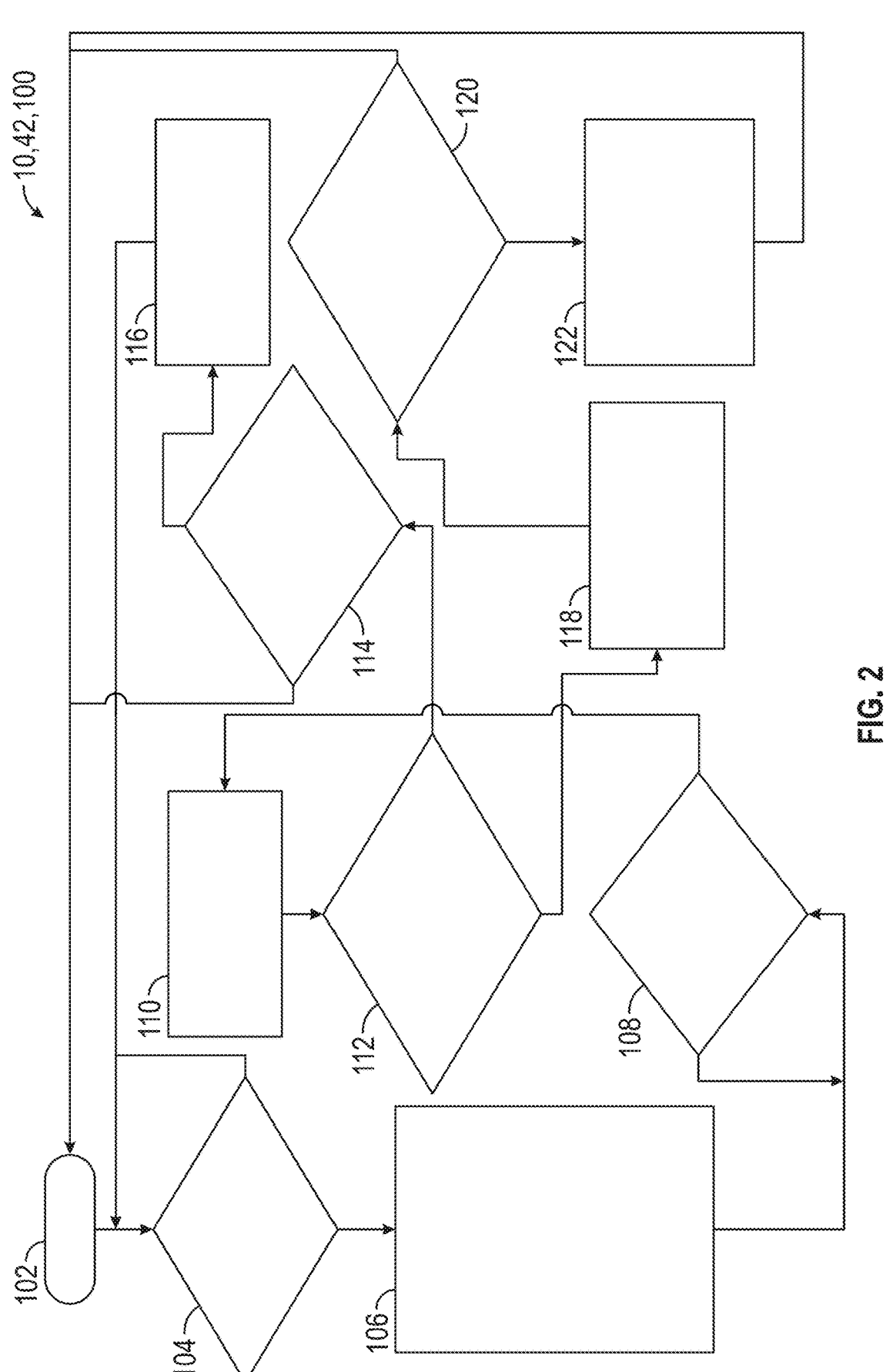
FIG. 2 is a flowchart depicting a method of trailer loading suspension sway and rollaway detection and prevention according to an exemplary embodiment.

Referring now to FIG. 2 and with continuing reference to FIG. 1, the system 10 utilizes one or more applications 40, specifically a trailer 14 loading, suspension sway and rollaway detection (TLSR) application 42 stored in the memory 36 to manage and coordinate vehicle 12 and trailer 14 state as the trailer 14 is being loaded while attached to the vehicle 12 via the hitch 16. The TLSR application 42 is shown in FIG. 2 in flowchart form, as a method 100, depicting a plurality of subroutines that perform distinct, but interrelated functions, that cause the trailer 14 to be loaded properly such that trailer 14 sway and vehicle 12 rollaway are effectively and efficiently prevented.

More specifically, the TLSR application 42 begins at block 102. At block 104, the method 100 executes a first subroutine or control logic of the TLSR application 42 that determines whether the vehicle 12 is equipped with vehicle 12 axle 19A, 19B load detection equipment. The axle 19A, 19B load detection equipment may include any of a wide variety of sensors 18, including but not limited to those described hereinabove. Upon determining, at block 104, that the vehicle 12 does not include the requisite vehicle 12 axle 19A, 19B load detection equipment, or that some other initialization condition has not been met, the method 100 returns to block 102 and restarts. However, when at block 104, the TLSR application 42 determines that the vehicle 12 is equipped with axle 19A, 19B load detection equipment, the method 100 proceeds to block 106. At block 106, the TLSR application 42 and method 100 utilize vehicle 12 onboard sensors 18 to monitor vehicle static and dynamic state information including, but not limited to: vehicle 12 wheel 20 speed, a current transmission 24 state, a current brake 21 application state, a suspension system load, a trailer 14 connected state, and a trailer 14 loading mode when such a mode is available on the vehicle 12.

The method 100 subsequently proceeds to block 108, where the TLSR application 42 determines whether a trailer 14 is connected to the vehicle 12 via the hitch 16, whether the transmission 24 is in a "PARK" state, and whether the brakes 21 of the vehicle 12 are currently applied. More specifically, the system 10 and method 100 may determine whether a trailer 14 is connected to the vehicle 12 via the presence or absence of an electrical connection between the vehicle 12 and trailer 14, via camera, radar, LiDAR, or other electromagnetic data indicating the presence of a trailer 14 affixed to the hitch 16 of the vehicle, and/or by mechanical, hydraulic, or other such connections between the vehicle 12 and trailer 14. Upon determining that any one of: a trailer 14 is not currently connected to the vehicle 12, the transmission 24 is not currently in "PARK", and/or the brakes 21 are currently applied, the method 100 and TLSR application 42 continue to monitor, via the vehicle 12 sensors 18 until such time as all of these threshold conditions are met. That is, the until the sensors 18 all report that a trailer 14 is connected to the vehicle 12 via the hitch 16, the transmission 24 is in a "PARK" state, and the brakes 21 of the vehicle 12 are not currently applied, the TLSR application 42 and method 100 remain at block 106 and 108. In some non-limiting examples, the sensors 18 may detect that a trailer 14 is connected to the vehicle 12 via software, electrical connectivity or resistance, changes in suspension loading levels, or the like. In additional examples, the system 10 may be notified by direct or indirect input received via a human-machine interface (HMI) 44 through which a vehicle 12 operator confirms the presence and attachment of a trailer 14 to the vehicle 12 at the hitch 16. The HMI 44 may take a variety of different forms without departing from the scope or intent of the present disclosure. In some non-limiting examples, the HMI 44 is one or more of an infotainment screen, an instrument cluster, or other such display disposed on and/or integrated into the vehicle 12. In additional examples, the HMI 44 may include one or more buttons, haptic feedback devices, touch-sensitive panels, or the like disposed on or integrated into various components of an exterior surface of the vehicle 12 or an interior passenger compartment of the vehicle 12. In still further non-limiting examples, the HMI 44 may include a mobile computing device, such as a laptop computer, tablet computer, cellular phone, or other such wireless-communication-enabled device accessible by the vehicle 12 operator. Once the threshold conditions at block 108 have been met, the method 100 and TLSR application 42 proceed to block 110, where the TLSR application 42 monitors the suspension to determine a front/rear axle 19A, 19B relative load.

Utilizing the data from block 110, the TLSR application 42 and method 100 determine, at block 112, whether the suspension system detects whether a rear axle 19B load is reduced or negative, relative to the front axle 19A load. In several aspects, it should be appreciated that a vehicle's 12 weight may be described as a "curb weight", which is distributed across front and rear axles 19A, 19B in a typical vehicle 12. Accordingly, when a trailer 14 is affixed to the hitch 16, a rear axle 19B load is often altered from the vehicle's 12 curb weight.

Upon determining that the rear axle 19B load is positive, i.e. that a vertical load on the rear axle 19B indicates that the current rear axle 19B load is greater than the expected rear axle 19B curb weight or load, the TLSR application 42 and method 100 proceed to block 114. At block 114, the TLSR application 42 and method 100 determine whether the positive vertical load currently being exerted on the rear axle 19B meets or exceeds a predetermined calibratable positive threshold. In some examples, the predetermined calibratable positive threshold defines any vertical load of on the rear axle 19B that is greater than a hitch 16 load capacity, a vehicle 12 suspension load capacity, as defined by materials quality, engineering standards, or the like. Upon determining, at block 114 that the positive vertical load is greater than or equal to the predetermined calibratable positive threshold, then TLSR application 42 and method 100 proceed to block 116. At block 116, the TLSR application 42 and method 100 generates a notification to the vehicle 12 operator. Specifically, the TLSR application 42 and method 100 provide the notification to the vehicle 12 operator in any of a variety of different ways via one or more of the HMI 44 and via one or more audiovisual alerts projected from the vehicle's 12 exterior 46 without departing from the scope or intent of the present disclosure. In some non-limiting examples, the notification is provided via one or more lamps, and more specifically rear stop lamps, emergency lamps, turn signals, hazard lights, reversing lamps, load indicator lamps, headlights, foglights, and/or high-level stop lamps of the vehicle 12. Additional notifications may be provided via audible alerts, such as the engagement of a vehicle 12 horn system, vehicle 12 passenger compartment and/or external audio speakers, or the like. In an exemplary non-limiting example, the notification is displayed via lamps or lights 48 of a rear of the vehicle 12 in positions that are visible to a vehicle 12 and/or trailer 14 operator as the trailer 14 is being loaded. In addition, the notification may be sent directly or indirectly via a cloud server 52 to the HMI 44. The notifications are then presented via audiovisual prompts on the HMI 44, which may include a vehicle 12 operator's cellular phone, so that the vehicle 12 operator can effectively and accurately adjust a trailer 14 load position while performing live monitoring of trailer 14 load position as reported by the vehicle 12 sensors 18 and the TLSR application 42. The notification generated at block 116 may include a variety of information, including warnings of hitch 16 overloading, or the like, as well as an indication that a cargo load on or within the trailer 14 requires adjustment in order to reduce the current hitch 16 load. From block 116, the method 100 and TLSR application 42 proceed back to blocks 102 and/or 104 and the system 10 continues monitoring the vehicle 12 via the sensors 18. However, when at block 114, a positive hitch 16 load does not exceed the predetermined calibratable positive threshold, the method 100 and TLSR application 42 proceed directly back to blocks 102 and/or 104 and the system 10 continues monitoring the vehicle 12 via the sensors 18.

Referring once more to block 112, when a trailer 14 is attached to the hitch 16 of an exemplary vehicle 12, and the trailer 14 is loaded such that the "tongue load" (the vertical load on the hitch 16) is negative, then the trailer 14 is effectively reducing a vertical load or normal force incident upon the rear axle 19B from a first level to a second level less than the first level. When such alterations to the vehicle's 12 curb weight cause the rear axle 19B of the vehicle 12 to be loaded with less than a predetermined un-loaded curb weight, the vehicle 12 has an increased potential for trailer 14 sway or rollaway to occur. Accordingly, at block 112, when the rear axle 19B load is determined to be negative, the method 100 and TLSR application 42 proceed to block 118.

At block 118, when a calibratable minimum negative load threshold load on the rear axle 19B is detected, the TLSR application 42 and method 100 generates a notification to the vehicle 12 operator of a potential sway condition. In several aspects, the calibratable minimum negative load threshold load defines a zero, neutral, or a small amount of negative tongue weight. In some non-limiting examples, the calibratable minimum negative load threshold is a range of negative tongue weights or rear axle 19B loads that extends from approximately a zero or neutral load to an approximately 25% negative load on the rear axle 19B. The notification may include a "SWAY ALERT" provided to the vehicle 12 operator in any of a variety of different ways via one or more of the HMI 44 and via one or more audiovisual alerts projected from the vehicle's 12 exterior 46 without departing from the scope or intent of the present disclosure. In some non-limiting examples, the notification is provided via one or more lamps, and more specifically rear stop lamps, emergency lamps, turn signals, hazard lights, reversing lamps, load indicator lamps, headlights, foglights, and/or high-level stop lamps of the vehicle 12. Additional notifications may be provided via audible alerts, such as the engagement of a vehicle 12 horn system, vehicle 12 passenger compartment and/or external audio speakers, or the like. In an exemplary non-limiting example, the notification is displayed via lamps or lights of a rear 48 of the vehicle 12 in positions that are visible to a vehicle 12 and/or trailer 14 operator as the trailer 14 is being loaded. In addition, the notification may be sent directly or indirectly via a cloud server 52 to the HMI 44. The notifications are then presented via audiovisual prompts on the HMI 44, which may include a vehicle 12 operator's cellular phone, so that the vehicle 12 operator can effectively and accurately adjust a trailer 14 load position while performing live monitoring of trailer 14 load position as reported by the vehicle 12 sensors 18 and the TLSR application 42. Referring once more to block 112, once the vehicle 12 operator has properly adjusted the position of a load on the trailer 14 to cause the trailer 14 to exert a positive load on the hitch 16 and rear axle 19B, notifications of potential sway or rollaway automatically cease.

Subsequently, at block 120, the TLSR application 42 and method determine whether a quantity of negative tongue loading has exceeded a calibratable negative rear axle load threshold and/or whether front axle 19A roll is detected. It will be appreciated that powertrain systems 22 of tow-hitch 16 equipped vehicles 12 frequently motivate the rear axle 19B of the vehicles, and even in vehicles having front-wheel drive (i.e. front axle 19A drive), all-wheel or four-wheel drive (i.e. front and rear axle 19A, 19B drive), that transmission 24 position frequently only prevents rotation of one of the front and/or rear axles 19A, 19B. Moreover, when a negative tongue or negative hitch 16 load is sufficiently large, then the rear axle 19B load of the vehicle 12 may be so reduced that wheels 20 rotatably affixed to the rear axle 19B may lift completely off a surface or the ground 50 below the vehicle 12 or may be so underloaded that the wheels 50 no longer provide sufficient frictional contact with the ground 50 to prevent sway or rollaway conditions. In circumstances where the negative hitch 16 load meets or exceeds a calibratable negative rear axle load threshold or front axle 19A roll is detect, the method 100 and TLSR 42 proceed to block 122, where a "ROLLAWAY ALERT" is provided to the vehicle 12 operator. That is, when a sufficiently large quantity of negative hitch 16 load is detected, the system 10 notifies the vehicle 12 operator that a rollaway is possible.

The "ROLLAWAY ALERT" is provided to the vehicle 12 operator in any of a variety of different ways, as described above with respect to the "SWAY ALERT". That is, the "ROLLAWAY ALERT" is provided to the vehicle 12 operator via one or more of the HMI 44 and via one or more audiovisual alerts projected from the vehicle's 12 exterior 46 without departing from the scope or intent of the present disclosure. In some non-limiting examples, the notification is provided via one or more lamps, and more specifically rear stop lamps, emergency lamps, turn signals, hazard lights, reversing lamps, load indicator lamps, headlights, foglights, and/or high-level stop lamps of the vehicle 12. Additional notifications may be provided via audible alerts, such as the engagement of a vehicle 12 horn system, vehicle 12 passenger compartment and/or external audio speakers, or the like. In an exemplary non-limiting example, the notification is displayed via lamps or lights 48 of a rear of the vehicle 12 in positions that are visible to a vehicle 12 and/or trailer 14 operator as the trailer 14 is being loaded. In addition, the notification may, as described above, be sent directly or indirectly, via the cloud server 52, to the HMI 44 which subsequently presents the notification to the vehicle 12 operator, thereby allowing the vehicle 12 operator to effectively and accurately adjust a trailer 14 load position while performing live monitoring of trailer 14 load position as reported by the vehicle 12 sensors 18 and the TLSR application 42.

In addition, at block 122, the system 10, via the TLSR application 42 and method 100 engages an emergency braking system that enables and engages the vehicle 12 brakes 21, and in examples where the trailer 14 is equipped with brakes 21, the TLSR application 42 engages the brakes 21 of the trailer 14 as well. As previously described, once the vehicle 12 operator has properly adjusted the position of a load on the trailer 14 to cause the trailer 14 to exert a positive load on the hitch 16 and rear axle 19B, "ROLLAWAY ALERT" notifications automatically cease, and the TLSR application 42 and method 100 proceed back to block 102 to run again. That is, in several aspects, the "ROLLAWAY ALERT" notification may be more severe than the "SWAY ALERT", including but not limited to activation of a vehicle 12 horn, flashing vehicle 12 lamps, and the like. In addition, upon detection of a potential rollaway condition, the system 10 mitigates rollaway by applying brakes 21. Furthermore, on vehicles 12 equipped with brake 21 balance control, brake 21 application may be biased towards the front axle 19A of the vehicle 12.

The calibratable negative rear axle load threshold may vary substantially from application to application without departing from the scope or intent of the present disclosure. However, it should be appreciated that the calibratable negative rear axle load threshold for initiating a "SWAY ALERT" may be described as: conditions where a trailer 14 is attached to the vehicle 12 at the hitch 16, and a rear axle 19B curb weight or load is measured to be less than an un-loaded, and normal rear axle 19B curb weight or load when no trailer 14 is attached; and the "ROLLAWAY ALERT" may be described as: conditions where a trailer 14 is attached to the vehicle 12 at the hitch 16, and a rear axle 19B curb weight or load is measured to be less than fifty percent (50%) of an un-loaded, and normal rear axle 19B curb weight or load when a trailer 14 is not attached to the hitch 16.

Figure 3A:
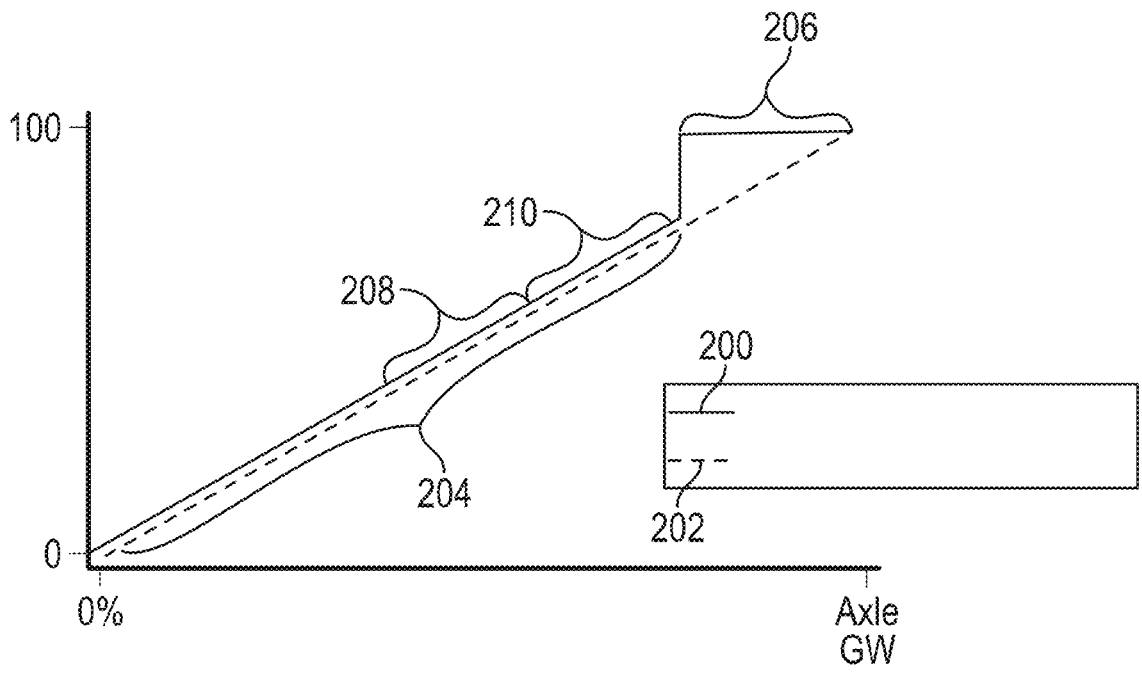
FIG. 3A is a graphical representation of trailer load and front suspension displacement of the system for trailer loading suspension sway and rollaway detection and prevention of FIG. 1 according to an exemplary embodiment.
Figure 3B:
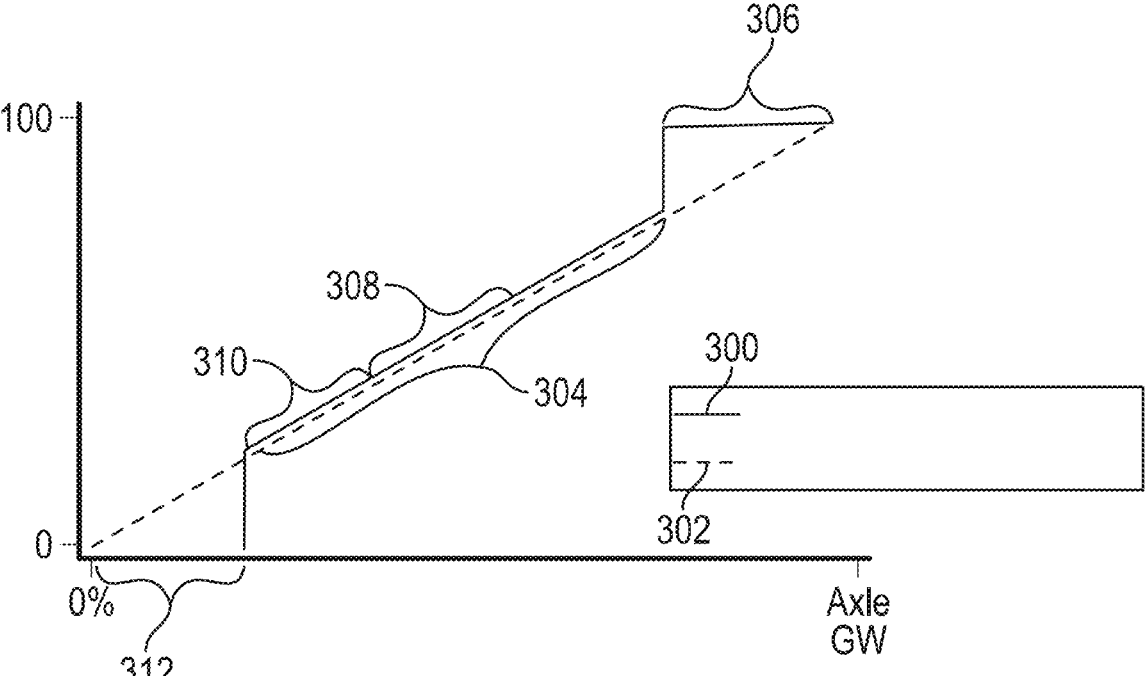
FIG. 3B is a graphical representation of trailer load and rear suspension displacement of the system for trailer loading suspension sway and rollaway detection and prevention of FIG. 1 according to an exemplary embodiment.

Turning now to FIGS. 3A and 3B and with continuing reference to FIGS. 1 and 2, a front and rear axle 19A, 19B loading estimates are shown in line graph form. More specifically FIG. 3A depicts a measured load on the front axle 19A of a vehicle 12 to which a trailer 14 is attached via a hitch 16. The graph depicts gross weight (GW) estimates along the X axis, and percentage along the Y axis. Trailer 14 load 200 is depicted as a first line plot against which front suspension displacement 202 is shown in a second line plot. A "normal" load 204 is depicted as extending from approximately 0% to approximately 80%, above which the trailer load 200 is shown in an overloaded 206 condition. Regions between about 40% and about 80% depict optimal trailer 14 and front suspension loading 208, as well as slight or lightly loaded trailer 14 and front suspension 210 conditions.

By contrast, FIG. 3B depicts a measured load on the rear axle 19B of a vehicle 12 to which a trailer 14 is attached via a hitch 16. The graph depicts gross weight (GW) estimates along the X axis, and percentage along the Y axis. Both FIGS. 3A and 3B depict the same series of situations, differing only in that FIG. 3A is directed to changes in front axle 19A load and rear suspension displacement, while FIG. 3B is directed to changes in rear axle 19B load and rear suspension displacement. In FIG. 3B, trailer 14 load 300 is depicted as a first line plot against which rear suspension displacement 202 is shown in a second line plot. A "normal" load 304 is depicted as extending from approximately 25% to approximately 75%, above which the trailer load 300 is shown in an overloaded 306 condition. Regions between about 25% and about 80% depict optimal trailer 14 and rear suspension loading 308, as well as slight or lightly unloaded trailer 14 and rear suspension 310 conditions. Below about 25%, FIG. 3B depicts a situation in which the rear axle 19B is fully and completely unloaded, and the rear axle 19B is beginning to lift or has lifted off the ground 50.

A system 10 and method 100 for trailer 14 loading suspension sway and rollaway detection and prevention of the present disclosure offers several advantages. These include, the ability to provide vehicle 12 operators with immediate, consistent, and accurate feedback about how a vehicle/trailer 12, 14 system is currently loaded, and whether adjustments to trailer 14 load position or load amount are required to ensure that the vehicle 12 will not enter a sway or rollaway condition. Moreover, the system 10 and method 100 of the present disclosure maintain or decrease overall system 10 complexity, improve system 10 redundancy and robustness, decrease the potential for improperly loaded trailers 14 to be used, reduce the potential for human operator error, and make effective and efficient use of preexisting hardware. Moreover, the system 10 and method 100 of the present disclosure may be adapted or installed as a package on vehicles 12 equipped with appropriate types of suspension load sensors, and the like without departing from the scope or intent of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for trailer loading suspension sway and rollaway detection in a vehicle comprises:
   a vehicle;
   a trailer movably attached to the vehicle via a hitch;
   one or more sensors, the one or more sensors directly or indirectly detecting a load on suspension of the vehicle;
   a controller having a processor, a memory, and input/output (I/O) ports, the I/O ports in communication with the one or more sensors, the processor executing program code portions stored in the memory, the program code portions including a TLSR application comprising:
   a first control logic for monitoring vehicle static and dynamic state information;
   a second control logic for determining that predetermined initialization conditions have been met;
   a third control logic that, upon determining that the initialization conditions have been met, monitors, via the one or more sensors, vertical loads on each of front and rear axles of the vehicle;
   a fourth control logic that determines a rear axle vertical load and generates at least one of: an overload alert, a sway alert, and a rollaway alert; and

a fifth control logic that upon generating at least one of the overload alert, sway alert, and rollaway alert, notifies a vehicle operator that a vertical load exerted by the trailer on the hitch has exceeded one or more of a positive load threshold, a calibratable minimum negative load threshold, and a calibratable negative rear axle load threshold, wherein notifications to the vehicle operator continue unless and until none of the positive load threshold, calibratable minimum negative load threshold and calibratable negative rear axle load threshold have been exceeded.

2. The system of claim 1, wherein the one or more sensors include:

wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle, comprising one or more of: suspension load detection sensors, suspension displacement sensors, Semi Active Damping Suspension (SADS), air suspension sensors, and continuous damping control (CDC) ride height sensors.

3. The system of claim 2, wherein the first control logic further comprises:

control logic that monitors vehicle wheel speed, transmission state or position, brake application state, suspension system load, trailer connectivity, and trailer loading mode.

4. The system of claim 3, wherein the second control logic further comprises:

control logic that determines that a trailer is connected to the vehicle at the hitch;

control logic that determines that a transmission of the vehicle is in a park state;

control logic that determines that brakes of the vehicle are not currently applied; and upon determining that one or more of: a trailer is not connected, the transmission is not in a park state, and the brakes are currently being applied, continues monitoring vehicle wheel speed, transmission state or position, brake application state, suspension system load, trailer connectivity; and upon determining that: a trailer is connected, the transmission is in a park state, and the brakes are not applied, generates an output indicating that the predetermined initialization conditions have been met.

5. The system of claim 1, wherein the fourth control logic further comprises:

control logic that, upon determining that a positive rear axle vertical load is being applied by the trailer via the hitch, compares the positive rear axle vertical load to a calibratable positive load threshold; and upon determining that the positive rear axle vertical load meets or exceeds the calibratable positive load threshold, generates a notification to the vehicle operator including an overload alert.

6. The system of claim 1, wherein the fourth control logic further comprises:

control logic that, upon determining that a zero or negative rear axle vertical load is being applied by the trailer via the hitch, compares the zero or negative rear axle vertical load to a calibratable minimum negative load threshold; and

upon determining that the negative rear axle vertical load does not exceed the calibratable minimum negative load threshold, generates a notification to the vehicle operator including a sway alert.

7. The system of claim 6, wherein the calibratable minimum negative load threshold further comprises:

a calibratable range of negative rear axle loads that extends from approximately a zero or neutral load to an approximately 25% negative load on the rear axle.

8. The system of claim 6, wherein the fourth control logic further comprises:

control logic that, upon determining that a negative rear axle vertical load is being applied by the trailer via the hitch, compares the negative rear axle vertical load to the calibratable negative rear axle load threshold; and upon determining that the negative rear axle vertical load meets or exceeds the calibratable negative rear axle load threshold or upon detecting front axle roll, generates a notification to the vehicle operator including a rollaway alert, wherein the calibratable negative rear axle load threshold further comprises: a range of values extending from approximately a 50% to a 100% negative load on the rear axle, wherein a 100% negative load on the rear axle indicates that the rear axle is entirely unloaded and that rear wheels attached to the rear axle no longer provide frictional contact with ground beneath the vehicle.

9. The system of claim 1, wherein the fifth control logic further comprises:

control logic that generates audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle;

control logic that generates notifications via wireless-communication-enabled devices including: mobile computing devices, laptop computers, tablet computers, and cellular phones, wherein the notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded.

10. The system of claim 9, wherein the fifth control logic further comprises:

control logic that automatically engages vehicle brakes during a rollaway alert, thereby preventing the vehicle and trailer from rolling despite the trailer exerting a negative rear axle load that meets or exceeds the calibratable negative rear axle load threshold.

11. A method for trailer loading suspension sway and rollaway (TLSR) detection in a vehicle comprises:

directly or indirectly detecting a load exerted by a trailer on suspension of the vehicle with one or more sensors, wherein the trailer is movably attached to the vehicle via a hitch;

executing, by a processor of a controller of the vehicle, program code portions stored in memory of the controller, the controller further including input/output (I/O) ports in communication with the one or more sensors, the program code portions including a TLSR application comprising control logic for:

monitoring vehicle static and dynamic state information;

determining that predetermined initialization conditions have been met;

upon determining that the initialization conditions have been met, monitoring, via the one or more sensors, vertical loads on each of front and rear axles of the vehicle;

determining a rear axle vertical load and generating at least one of: an overload alert, a sway alert, and a rollaway alert; and upon generating at least one of the overload alert, sway alert, and rollaway alert, notifying a vehicle operator that a vertical load exerted by the trailer on the hitch has exceeded one or more of a positive load threshold, a calibratable minimum negative load threshold, and a calibratable negative rear axle load threshold, wherein notifications to the vehicle operator continue unless and until none of the positive load threshold, calibratable minimum negative load threshold and calibratable negative rear axle load threshold have been exceeded.

12. The method of claim 11, further comprising:

directly or indirectly detecting a load exerted by the trailer on suspension of the vehicle with one or more of wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle, comprising one or more of: suspension load detection sensors, suspension displacement sensors, Semi Active Damping Suspension (SADS), air suspension sensors, and continuous damping control (CDC) ride height sensors.

13. The method of claim 12, further comprising monitoring vehicle wheel speed, transmission state or position, brake application state, suspension system load, trailer connectivity, and trailer loading mode.

14. The method of claim 13, further comprising:

determining that a trailer is connected to the vehicle at the hitch;

determining that a transmission of the vehicle is in a park state;

determining that brakes of the vehicle are not currently applied; and upon determining that one or more of: a trailer is not connected, the transmission is not in a park state, and the brakes are currently being applied, continuing to monitor vehicle wheel speed, transmission state or position, brake application state, suspension system load, trailer connectivity; and upon determining that: a trailer is connected, the transmission is in a park state, and the brakes are not applied, generating an output indicating that the predetermined initialization conditions have been met.

15. The method of claim 11, further comprising:

upon determining that a positive rear axle vertical load is being applied by the trailer via the hitch, comparing the positive rear axle vertical load to a calibratable positive load threshold; and upon determining that the positive rear axle vertical load meets or exceeds the calibratable positive load threshold, generating a notification to the vehicle operator including an overload alert.

16. The method of claim 11, further comprising:

upon determining that a zero or negative rear axle vertical load is being applied by the trailer via the hitch, comparing the zero or negative rear axle vertical load to a calibratable minimum negative load threshold, wherein the calibratable minimum negative load threshold further comprises:

a calibratable range of negative rear axle loads that extends from approximately a zero or neutral load to an approximately 25% negative load on the rear axle; and upon determining that the negative rear axle vertical load does not exceed the calibratable minimum negative load threshold, generating a notification to the vehicle operator including a sway alert.

17. The method of claim 16, further comprising:

upon determining that a negative rear axle vertical load is being applied by the trailer via the hitch, comparing the negative rear axle vertical load to the calibratable negative rear axle load threshold; and upon determining that the negative rear axle vertical load meets or exceeds the calibratable negative rear axle load threshold or upon detecting front axle roll, generating a notification to the vehicle operator including a rollaway alert, wherein the calibratable negative rear axle load threshold further comprises: a range of values extending from approximately a 50% to a 100% negative load on the rear axle, wherein a 100% negative load on the rear axle indicates that the rear axle is entirely unloaded and that rear wheels attached to the rear axle no longer provide frictional contact with ground beneath the vehicle.

18. The method of claim 11, further comprising:

generating audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle;

generating notifications via wireless-communication-enabled devices including: mobile computing devices, laptop computers, tablet computers, and cellular phones, wherein the notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded.

19. The method of claim 18, further comprising:

automatically engaging vehicle brakes during a rollaway alert, thereby preventing the vehicle and trailer from rolling despite the trailer exerting a negative rear axle load that meets or exceeds the calibratable negative rear axle load threshold.

20. A method for trailer loading suspension sway and rollaway (TLSR) detection in a vehicle comprises:

directly or indirectly detecting a load exerted by a trailer on suspension of the vehicle with one or more sensors including: wheel speed sensors, brake sensors, throttle position sensors, accelerator pedal position sensors, powertrain system sensors, transmission sensors, engine control sensors, inertial measurement units (IMUs), global positioning system (GPS), and sensors capable of directly and/or indirectly measuring a vertical or normal force loading and/or a vertical displacement or ride height of a front axle and a rear axle of the vehicle, comprising one or more of: suspension load detection sensors, suspension displacement sensors, Semi Active Damping Suspension (SADS), air suspension sensors, and continuous damping control (CDC) ride height sensors, wherein the trailer is movably attached to the vehicle via a hitch;

executing, by a processor of a controller of the vehicle, program code portions stored in memory of the controller, the controller further including input/output (I/O) ports in communication with the one or more sensors, the program code portions including a TLSR application comprising control logic for:

monitoring vehicle wheel speed, transmission state or position, brake application state, suspension system load, trailer connectivity, and trailer loading mode;

determining that predetermined initialization conditions have been met, including:

determining that a trailer is connected to the vehicle at the hitch;

determining that a transmission of the vehicle is in a park state;

determining that brakes of the vehicle are not currently applied; and upon determining that one or more of: a trailer is not connected, the transmission is not in a park state, and the brakes are currently being applied, continuing to monitor vehicle wheel speed, transmission state or position, brake application state, suspension system load, trailer connectivity; and upon determining that: a trailer is connected, the transmission is in a park state, and the brakes are not applied, generating an output indicating that the predetermined initialization conditions have been met, and monitoring via the one or more sensors, vertical loads on each of front and rear axles of the vehicle;

determining a rear axle vertical load and generating at least one of: an overload alert, a sway alert, and a rollaway alert, wherein:

upon determining that a positive rear axle vertical load is being applied by the trailer via the hitch, comparing the positive rear axle vertical load to a calibratable positive load threshold; and upon determining that the positive rear axle vertical load meets or exceeds the calibratable positive load threshold, generating a notification to a vehicle operator including an overload alert;

upon determining that a zero or negative rear axle vertical load is being applied by the trailer via the hitch, comparing the zero or negative rear axle vertical load to a calibratable minimum negative load threshold, wherein the calibratable minimum negative load threshold further comprises:

a calibratable range of negative rear axle loads that extends from approximately a zero or neutral load to an approximately 25% negative load on the rear axle; and upon determining that the negative rear axle vertical load does not exceed the calibratable minimum negative load threshold, generating a notification to the vehicle operator including a sway alert;

upon determining that a negative rear axle vertical load is being applied by the trailer via the hitch, comparing the negative rear axle vertical load to the calibratable negative rear axle load threshold; and upon determining that the negative rear axle vertical load meets or exceeds the calibratable negative rear axle load threshold or upon detecting front axle roll, generating a notification to the vehicle operator including a rollaway alert, wherein the calibratable negative rear axle load threshold further comprises: a range of values extending from approximately a 50% to a 100% negative load on the rear axle, wherein a 100% negative load on the rear axle indicates that the rear axle is entirely unloaded and that rear wheels attached to the rear axle no longer provide frictional contact with ground beneath the vehicle;

upon generating at least one of the overload alert, sway alert, and rollaway alert, providing the overload alert, sway alert, and rollaway alert to vehicle operators via audiovisual and/or haptic feedback notifications to the vehicle operator via one or more of: a human-machine interface (HMI), including touch-sensitive panels disposed on or integrated into various components of an exterior surface of the vehicle or an interior passenger compartment of the vehicle, lights affixed to the exterior surface of the vehicle, and a horn of the vehicle; and generating notifications via wireless-communication-enabled devices including: mobile computing devices, laptop computers, tablet computers, and cellular phones, wherein the notifications provide audiovisual indications that a load on the trailer is meeting or exceeding one or more of the positive load threshold, the calibratable minimum negative load threshold, and the calibratable negative rear axle load threshold unless and until none of the positive load threshold, calibratable minimum negative load threshold and calibratable negative rear axle load threshold have been met or exceeded; and automatically engaging vehicle brakes during a rollaway alert, thereby preventing the vehicle and trailer from rolling despite the trailer exerting a negative rear axle load that meets or exceeds the calibratable negative rear axle load threshold.

* * * * *